Figure 1:
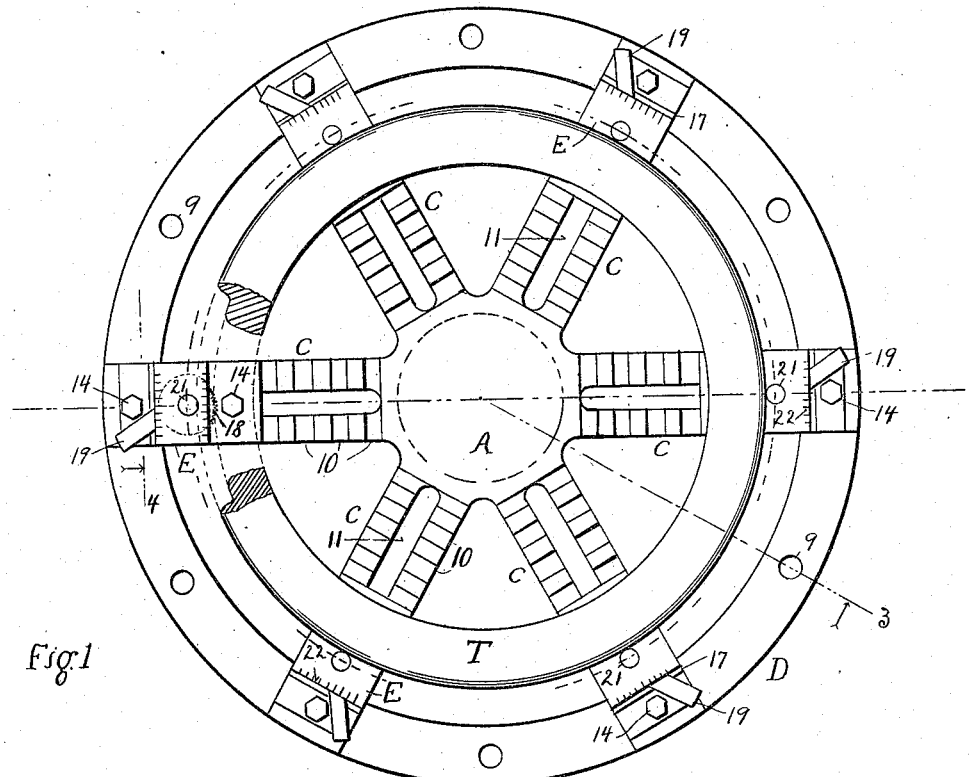

G. L. BENNETT.
CHUCK FOR BORING AND TURNING LOCOMOTIVE TIRES, &c.
APPLICATION FILED MAY 15, 1908.

921,066.

Patented May 11, 1909.

Witnesses
 Rosen
John A Hulit

Inventor
George L. Bennett
By J A Rosen
Atty

UNITED STATES PATENT OFFICE.

GEORGE L. BENNETT, OF TOPEKA, KANSAS, ASSIGNOR OF TWO-THIRDS TO JOHN PUTNAM AND WILMER J. CONDIT, OF TOPEKA, KANSAS.

CHUCK FOR BORING AND TURNING LOCOMOTIVE-TIRES, &c.

No. 921,066.   Specification of Letters Patent.   Patented May 11, 1909.

Application filed May 15, 1908. Serial No. 433,012.

*To all whom it may concern:*

Be it known that I, GEORGE L. BENNETT, a citizen of the United States, residing in Topeka, in the county of Shawnee and State of Kansas, have invented a new and useful Improvement in Chucks for Boring and Turning Locomotive-Tires and the Like, of which the following is a specification.

My invention relates to chucks to be used on boring mills, lathes, and similar machines, for the purpose of holding any work to be bored out or turned on the outside.

My invention is especially useful as a chuck for a boring mill for holding locomotive engine driving wheel tires while such tires are being bored out, and also while they are being turned on the outside. It is also especially useful for boring out and turning car wheel tires, and other similar work.

The object of my invention is to improve generally upon chucks of this nature; also to provide a chuck especially adapted for firmly holding locomotive tires and the like while being bored and turned; also to provide such a device in which it is impossible for the work to slip; also to provide a chuck of this general nature in which the work may be applied and from which it may be removed more readily than with other devices of this nature; also to provide a chuck of this nature in which the work may be accurately centered and yet readily applied; also to provide a chuck of this general nature which may be used for both boring out and turning the tires, being applicable both to the inside and to the outside of the tire and being readily adjustable to either application; also to provide a chuck of this general nature which is adjustable to various sizes of tires and the like, and wherein the adjustment may be quickly accomplished; also to provide a device of this nature which is of such simple and efficient construction and of such wide range of adaptability that the amount of work turned out from a mill may be greatly increased. And my invention consists of the parts, improvements, and combinations herein described and claimed.

In the drawings accompanying and forming part of this specification, and in the description of the drawings, I have shown my invention in its preferred form and have also shown the best mode of applying the principles thereof; but it is to be understood that my invention itself is not confined to the exact details of those drawings or of that description, and that I contemplate changes in form, proportions, materials, and arrangement, the transposition of parts, and the substitution of equivalent members, without departing from the spirit of the invention.

Figure 2:
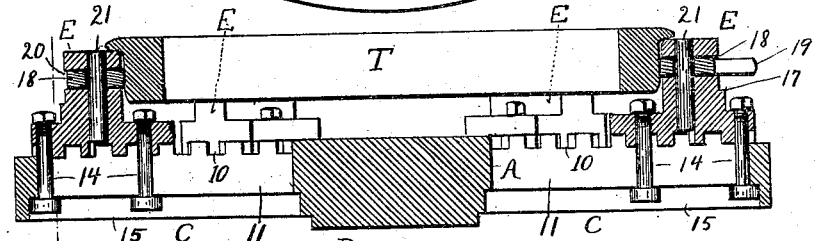
Figure 4:
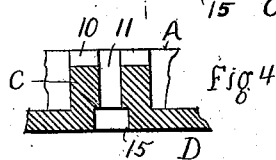
Figure 3:
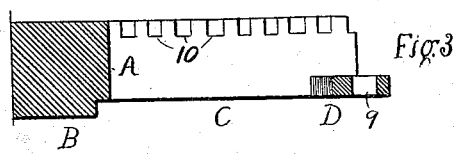
Figures 5, 6:
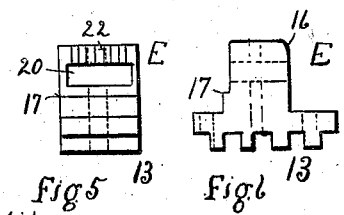
Figures 7, 8:
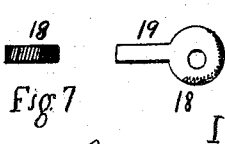

Figure 1 is a plan view of a chuck constructed in accordance with the principles of my invention, with a locomotive tire applied thereto, a portion of the tire being broken away to disclose the cam and jaw or cam-block. Fig. 2 is a center sectional view of the same. Fig. 3 is a sectional view of the chuck frame through the line 3 of Fig. 1. Fig. 4 is a section of a portion of the frame through the line 4 of Fig. 1. Figs. 5 and 6 are end and side views, respectively of one of the jaws or cam-blocks. And Figs. 7 and 8 are, respectively, end and plan views of the cam.

Similar reference characters indicate like or corresponding parts throughout the several views.

A is the hub or center piece of the frame of the chuck, provided with a center lug B, whereby it may be exactly centered by engaging in a corresponding recess in the boring mill table or in the face-plate of a lathe. Extending radially from the hub are a plurality of ribs C, C, each being adapted for adjustably supporting the cam-blocks or jaws as hereinafter described. The frame is completed by a ring D concentric with the hub and frame as a whole and connecting the several ribs. The ring is provided with a number of bolt holes 9, 9, through which may be extended bolts for rigidly securing the chuck to the table. Each rib is grooved transversely, as at 10, 10, slotted longitudinally, as at 11, and counterslotted, as at 15.

E is a cam-block, or jaw, its under side being provided with lugs and grooves 13 corresponding with the grooved face of the rib; there being one such block for each rib. Each block is rigidly secured to the rib by means of two bolts 14, 14, whose heads engage in the shoulder formed by the counter-slot 15. The grooves and lugs 10 and 13 are cut and formed accurately, so that the block E may be placed at any desired point along the rib and rigidly secured there by means of the bolts. As the grooves on all the ribs correspond with each other, the blocks may be readily set at equal distances from the center. The upper inner corner of the block should be rounded off to correspond with the fillet of the tire; and the outer face should be provided with a step or shoulder 17 for supporting the tire clear of the bolts 14 when the tire is supported on the outside of the blocks for turning.

18 is a cam, with a handle 19, and pivoted in an opening 20 in the cam-block, by a pin 21. Preferably the engaging face of the cam is toothed, the edges of the teeth extending diagonally across the cam in such direction that the gripping by the cam will tend to force the work downward, or rather so as to overcome the tendency of pulling the tire or work upwardly. The top of the cam-block may have graduating marks along the outer and inner faces and also on said faces at the top, as indicated at 22; by means of which all of the cams may be set in the exact position required to exactly center the work; the handle may serve as the indicator, or a notch or mark may be provided on the cam.

T represents a tire held in the chuck for boring.

Preferably the frame or body of the chuck is made of cast steel. The jaws or cam-block may also be made of cast steel; the cams and pins may be made of tool steel and hardened; and the bolts and nuts may be made of steel and the nuts hardened.

To use the device, the cam-blocks may be set in such position as to be applied to the work or tire to be bored. The cams may then all be turned exactly the same degree until they fit closely against the tire, which will exactly center it on the chuck and table. The cams are preferably located so as to engage the flat portion of the tire. On rotating the table and bringing the tool to the work, the resistance will merely draw the tire tighter between the cams, thus absolutely securing the tire in the chuck and preventing its accidental displacement. The work may be readily removed upon releasing the cams by the handles. To turn the same tire on the outside, the cam-blocks may be moved inwardly and again secured in proper position by the bolts 14, 14. The cams may be turned over by removing the pins 21 and applied to the inner side of the tire, the tire resting on the steps 17 of the cam-blocks.

Obviously, the tires may be secured in the chuck and bored, removed, and turned, with great rapidity; also the chuck may be quickly adjusted to any size of work, and for either boring or turning; and the work will be held with absolute firmness. There may be only two of the ribs and cam-blocks; but for accurate and quick centering of the work three or more are better; and for large and heavy work there may be still more; thus for locomotive tire work and the like I contemplate six such ribs, cam-blocks, and cams, though obviously there may be more or less.

What I claim is:

1. In a machine of the kind described, the combination of a frame, cam-blocks adjustable radially thereon and each having a step on its outer face, and a cam pivoted to the cam-block above the step.

2. In a machine of the kind described, the combination of a frame, cam-blocks adjustable radially thereon and forming a support for the flange of a tire, and a cam pivoted to each cam-block below the upper face of the block.

3. In a machine of the kind described, the combination of a frame, cam-blocks adjustable radially thereon and forming a support for the flange of a tire and each having a step on its outer face, and a cam reversibly pivoted in each cam-block below said support and above the step.

In testimony whereof I have hereunto signed my name in the presence of subscribing witnesses.

GEORGE L. BENNETT.

Witnesses:
 W. A. SLOO,
 C. J. ROSEN.